Nov. 19, 1963   M. W. ASHER   3,111,217
CONVEYOR CHAIR HOLD-DOWN MEANS
Filed Oct. 9, 1962   3 Sheets-Sheet 1
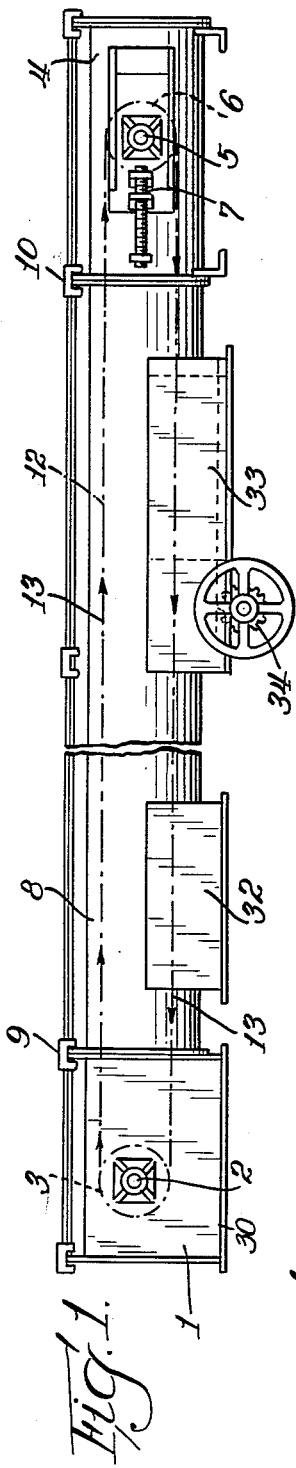
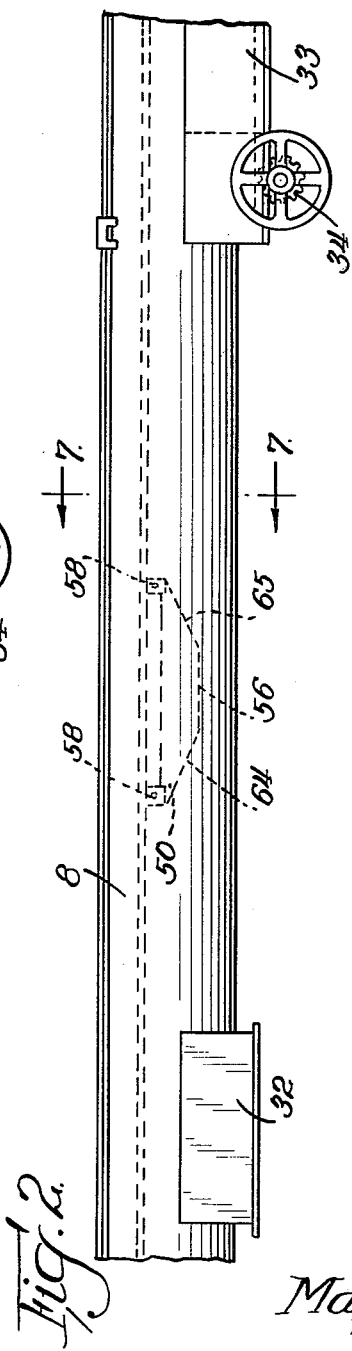
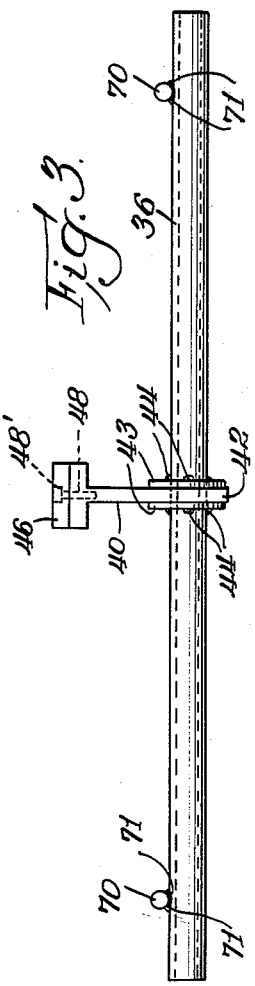
INVENTOR.
Max W. Asher
BY Nov. 19, 1963   M. W. ASHER   3,111,217
CONVEYOR CHAIR HOLD-DOWN MEANS
Filed Oct. 9, 1962   3 Sheets-Sheet 2
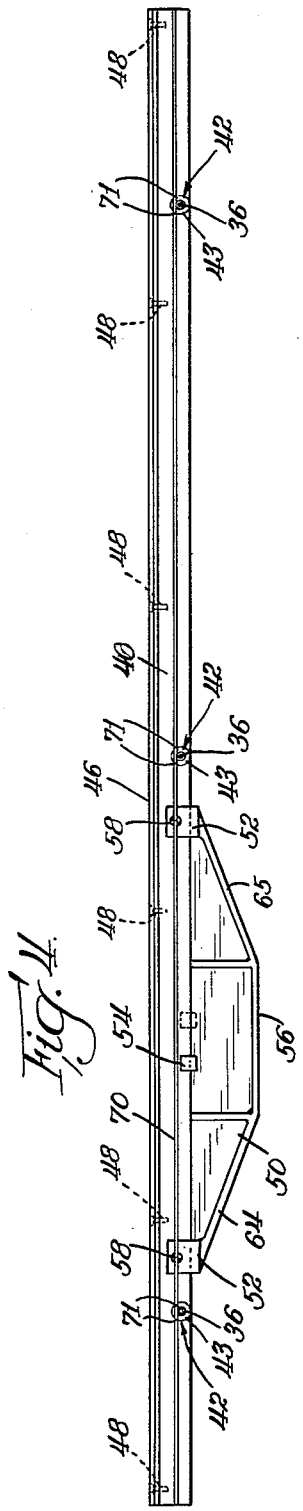
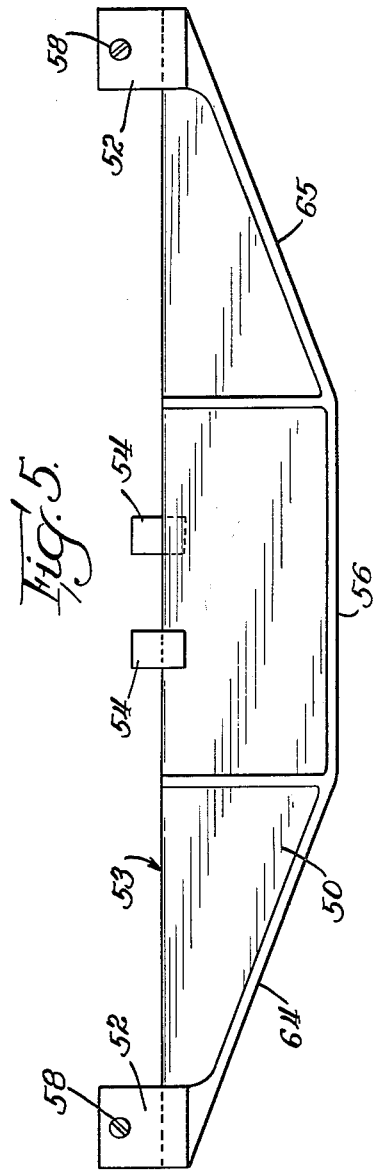
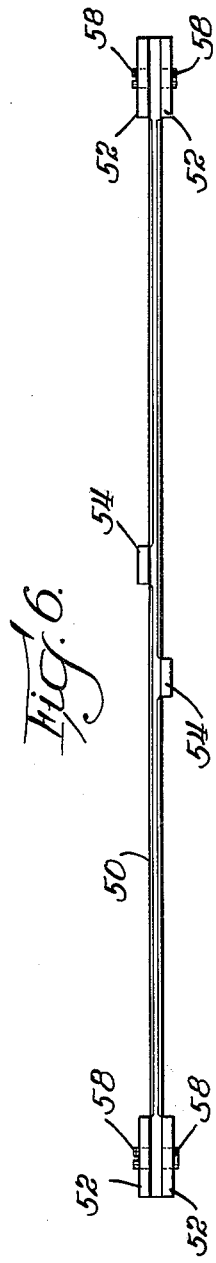
INVENTOR.
Max W. Asher
BY

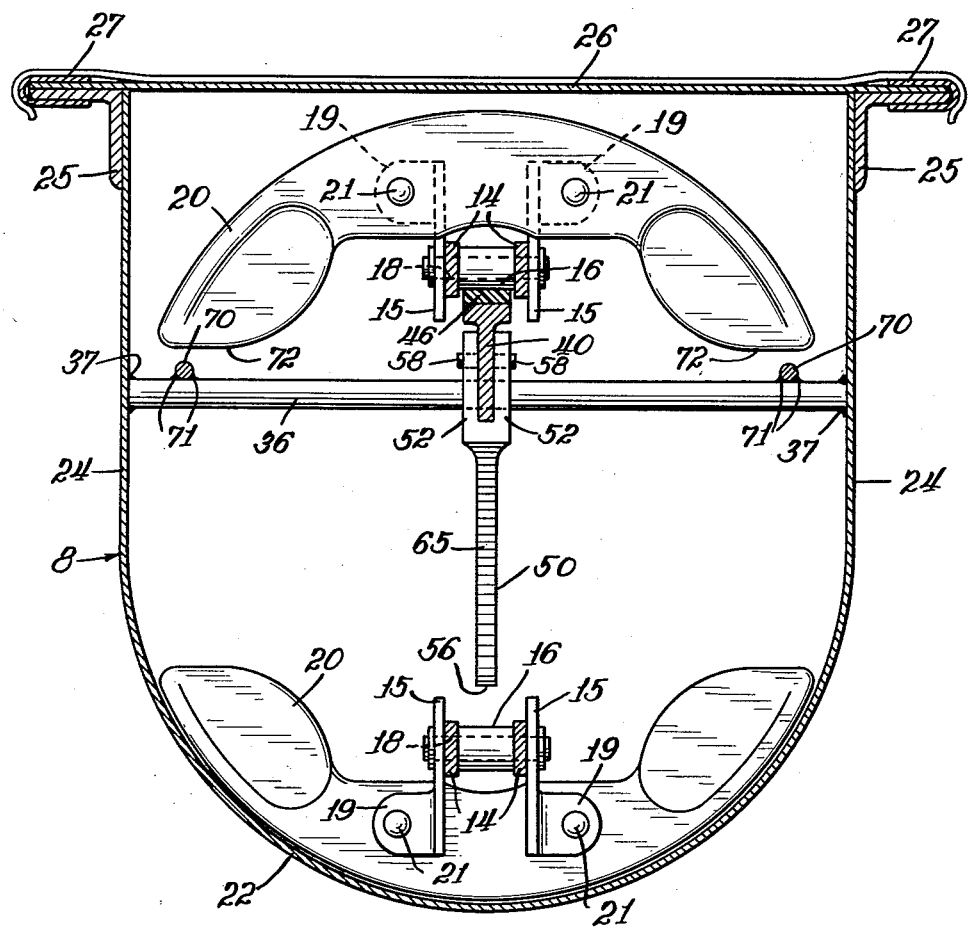

United States Patent Office 3,111,217
Patented Nov. 19, 1963

3,111,217
CONVEYOR CHAIN HOLD-DOWN MEANS
Max W. Asher, Riverdale, Ill., assignor to Screw Conveyor Corporation, Hammond, Ind., a corporation of Illinois
Filed Oct. 9, 1962, Ser. No. 229,336
6 Claims. (Cl. 198—174)

This invention relates, in general, to conveying apparatus and has particular relation to endless chain or belt type conveyors for horizontal and inclined conveying of grain, flour, feed, chemicals, coffee, starch, sugar, fertilizers, aggregates and other free flowing materials.

In general, such conveyors comprise an endless power driven chain, belt, or the like, with attached flights and with the lower run of the chain, belt, or the like and the attached flights operating in the bottom of a conveyor trough to move or convey the material along the trough either horizontally or at an incline.

With structures prior to the invention of Edward P. Escher, Patent No. 3,047,128, patented July 31, 1962, the lower run of the endless chain or belt and its attached flights have tended to ride up or rise out of the volume of material being conveyed, particularly in handling, for example, steeped materials, such as corn, or wet, moist, or heavy materials, cement, fine coal and other materials. Any such riding up or rise of the lower run of the chain, belt, or the like and its attached flights reduces the conveying action and tends to leave unconveyed material in the bottom of the trough.

Moreover, any such riding up or rise of the flights along the lower run of the endless chain, belt or the like may cause the flights to engage fixed supports or other parts within the conveyor trough. This may result in breaking off the corners of the flights, or otherwise injuring the flights, or in jamming or blocking the operation of the conveyor.

The broad concept of the present invention resides in the provision of improved hold-down means for keeping the flights along the lower run of the chain, belt, or the like properly positioned at all times in the volume of the material being conveyed, and more particularly hold-down means of such character that the hold-down means may be conveniently positioned or adjusted to avoid discharges or discharge spouts opening from the bottom of the conveyor trough.

Another object is to provide an improved hold-down bar and travel bar assembly in which the hold-down bar may be conveniently positioned or adjusted along the travel bar to avoid discharges or discharge spouts opening from the bottom of the conveyor trough and is detachably or removably secured to the travel bar in the desired position.

Another object is to provide an improved structure with which the customer or purchaser of the conveying apparatus can locate the hold-down bar to its best advantage and to avoid interfering with discharge from the conveyor trough.

Another object is to provide an improved structure with which one or more additional hold-down bars may be applied by the customer or purchaser of the conveying apparatus where desired.

Another object is to provide an improved structure for holding the travel bar in place and centering or positioning the same on the guide support pipes, and more particularly a structure in which the guide support pipes are passed through openings in the travel bar and washers are welded to the pipes at opposite sides of the travel bar to center or position the same on the guide support pipes without drilling and placing pins in place.

Another object is to provide an improved form of travel bar for supporting the return run of the endless chain, belt or the like, and more particularly a travel bar with plastic material on its upper surface for reducing wear on the endless chain, belt or the like and on the upper surface of the travel bar.

Another object is to provide pads or flanges on the hold-down bar with set screws for securing the hold-down bar in the desired position on the travel bar, particularly in position where the hold-down bar will avoid discharges or discharge spouts opening from the bottom of the conveyor trough, or be otherwise positioned to the best advantage.

Another object is to provide improved hold-down means of the character set forth which does not present ledges or the like along which the material being conveyed will tend to collect.

Another object is to provide hold-down means of the character set forth which accomplishes its desired purpose by engagement or cooperation with the endless chain, belt, or the like.

Another object is to provide a hold-down bar of the character set forth which has a lower hold-down portion intermediate its ends and is tapered in both directions from such lower hold-down portions so that the bar will act as set forth when the endless belt, chain or the like is moving in one direction and similarly when the endless belt, chain, or the like is reversed and driven in the opposite direction.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a longitudinal diagrammatic view showing one form of conveyor with which the present invention may be employed;

FIGURE 2 is a fragmentary side view of an intermediate portion of the conveyor trough showing the improved hold-down bar positioned between discharges or discharge spouts opening from the bottom of the conveyor trough;

FIGURE 3 is a view showing one of the guide support pipes and the structure for centering or positioning the travel bar and holding the same in place thereon;

FIGURE 4 is a side view showing the travel bar positioned and held in place on the guide support pipes and one of the hold-down bars attached to the travel bar;

FIGURE 5 is a side view of the hold-down bar;

FIGURE 6 is a top plan view of the hold-down bar; and

FIGURE 7 is a transverse sectional view taken along the line 7—7 of FIGURE 2.

Referring now to the drawings, the conveyor illustrated in FIGURE 1 comprises a standard head section 1 fitted with a shaft 2 bearings and a driving sprocket 3.

The tail section 4 comprises a tail shaft 5, sprocket 6, and take-up 7 which may be of standard or any other desired form.

The intermediate trough section, or sections 8 are attached at opposite ends to the head section 1 at 9 and to the tail section 4 at 10. Where there is more than one intermediate section 8, their adjacent ends are attached together, as well understood in the art.

The conveyor comprises an endless chain, belt, or the like 12 trained about sprockets 3 and 6 and driven in the direction indicated by the arrows 13 in FIGURE 1. If desired, the endless chain 12, or the like, may be reversed and driven in the opposite direction.

While a roller chain, cable, or other form of endless belt, or the like may be employed, the chain 12 selected for illustration comprises a plurality of pivotally connected inner and outer links 14 and 15 of steel or other suitable material. Hardened steel tubular bushings 16 are disposed between the inner links 14. The outer links 15 are disposed over the outer sides of the inner links 14 and the inner and outer links 14 and 15 are pivotally connected by pins 18, preferably hardened alloy steel pins, as shown more or less diagrammatically in FIGURE 7.

The outer links 15 are shown in FIGURE 7 in the form of attachment bars having out turned attachment lugs 19. Flights 20 for moving or conveying the material along the bottom of the conveyor trough, one illustrated form of such flights being shown in FIGURE 7, are attached to the lugs 19, for example, by machine screws 21 passing through openings in the lugs 19 and flights 20. It is to be understood that other of the outer links 15 to which flights are not attached may be of substantially the same width as the inner links 14.

The trough sections 8 may be standard U-shaped troughing, preferably galvanized and fitted together in the usual manner. The bottom of the trough is rounded at 22 and the shape of the flights fits the contour of the bottom of the trough as shown in FIGURE 7. Welded or otherwise secured to the upper portions of the outer surfaces of the sides 24 of the trough 8 are angle members 25. The top of the trough may be closed by cover plates 26 clamped and dust-sealed by clamping and dust-sealing means 27, which may be of the form more fully disclosed in United States Patent No. 2,459,770, Edward P. Escher, patented January 18, 1949. Other forms of covers and other forms of application thereof to the trough may be employed within the scope of the present invention.

The material which is to be handled by the conveyor may be delivered into the top of the trough, for example, by a spout (not shown) located as desired. When the endless chain 12 is driven, for example, in the direction indicated by the arrows 13 in FIGURE 1, the flights 20 convey the material along the bottom of the trough toward the left, as viewed in FIGURE 1 to the head section 1. The bottom of the head section 1 is open at 30, and the material is discharged downwardly through this opening.

While the discharge from the trough may be through the open bottom of the head section 1, it is to be understood that discharge from the trough may be at any point desired. If slide gates are required, they may be either flat or curved, and/or rack and pinion operated, or operated by manipulating a chain from below or remote position, or by an air cylinder from remote position, or otherwise as desired. An additional discharge with hand-slides is shown at 32 in FIGURE 1, and an additional discharge 33, curved or flat, with a rack and pinion 34 for operating the same, is shown in the same figure.

Disposed transversely between the slides 24 of the trough 8, at longitudinally spaced locations as shown in FIGURES 4 and 7, are cross steel guide supports 36. These guide supports 36 are shown in the form of pipes or of tubular form, but this may vary. The supports 36 are shown as welded at their opposite ends at 37 to the sides of the trough 8. This too may vary. For example, instead of welding the ends of the supports 36 to the trough, the supports 36 may be bolted in place, for example, by a rod extending through the pipes 36 with nuts threaded on the opposite ends of the rods and against the outer surfaces of the sides 24 of the trough.

The upper run of the chain 12 is supported by a travel bar 40. This bar may be continuous longitudinally throughout the length of the trough. The bar 40 may be formed, for example, of commercial aluminum, and is centered between the sides 24 of the trough, or otherwise positioned and supported, as follows: the guide support pipes 36 are passed through openings 42 in the bar 40 and washers 43 are passed over the pipes 36 into position with one of the washers 43 against each of the opposite sides of the bar 40 adjacent the openings 42. The washers 43 are welded to the pipes 36 as indicated at 44 and hold the travel bar 40 centered between the sides 24 of the trough, or otherwise positioned, and without drilling and placing pins or the like in place.

For the purpose of reducing wear on the chain 12 and particularly on the bushing 16 thereof and on the travel bar 40, a strip 46 of about ¼ inch thickness covers the upper surface of the bar 40 and is presented to the chain 12 as shown in FIGURE 7. The strip 46 is secured to the flanged top of the bar 40 by longitudinally spaced screws 48, the heads of which screws are countersunk beneath the upper surface of the strip 46 as indicated at 48'. The strip 46 reduces wear on the chain and on the travel bar in the movement of the upper run of the chain 12 over the strip 46.

The strip 46 may be in the form of a cold rolled steel strip, or it may be formed of "Ancorene," which is a high impact styrene, or of "Gatke," which is a graphatex material, or of other suitable materials.

A hold-down bar 50 is provided for keeping the flights 20 along the lower or conveying run of the chain 12 properly positioned at all times in the volume of material being conveyed, and against objectionable riding up or rise of the flights 20 out of the volume of the material in the bottom of the trough. The bar 50 may be formed, for example, of aluminum alloy, and has at each of its opposite ends a pair of upstanding spaced flanges 52 for receiving therebetween the travel bar 40 when the flanges 52 are slipped over the lower portion of the travel bar. The flanges 52 project above the upper edge 53 of the bar 50.

The bar 50 also has integral pads or flanges 54 one projecting upwardly above the edge 53 on one side of the bar 50 and the other projecting upwardly above the edge 53 on the opposite side of the bar. Thus, when the flanges 52 are slipped over opposite sides of the travel bar one flange or pad 54 is positioned against one side of the travel bar and the other flange or pad 54 is positioned against the other side of the travel bar.

As shown in FIGURES 2 and 5, the lower edge of the bar 50 has a lower hold-down portion 56 positioned intermediate the opposite ends thereof. This hold-down portion 56 overlies the chain 12 and particularly in the illustrated embodiment of the invention the bushings 16 thereof in spaced relation upwardly therefrom. If the flights 20 ride upwardly or rise from the material being conveyed, the chain 12 thus engages or coacts with the hold-down bar 50 and the flights 20 are thus held properly in the volume of the material. The flights are thus at all times kept in the volume of the material and carry a deep load either horizontally or at any reasonable incline.

With the flanges 52 and pads or flanges 54 slipped over opposite sides of the travel bar 40, the hold-down bar 50 is secured in place on the travel bar 40 by tightening set screws 58 threaded into threaded openings in the spaced flanges 52 into engagement with the opposite sides of the travel bar 40 at opposite ends of the hold-down bar 50.

The aforementioned mounting of the hold-down bar 50 enables the customer or purchaser of the conveying apparatus to locate the hold-down bar 50 to its best advantage and where it will not interfere with the discharge from the conveyor trough. For example, in FIGURE 2 the hold-down bar 50 is shown in position between the discharge and hand-slides as shown at 32 in FIGURES 1 and 2 and an additional discharge 33, curved or flat, with a rack and pinion 34 for operating the same. These discharges vary in their positioning and relation in different installations and the mounting of the hold-down bar 50 enables the customer or purchaser to locate the hold-down bar where it will not interfere with the discharge, for example, through such discharges.

Moreover, with the improved hold-down bar and travel bar assembly of the present application, one or more additional hold-down bars may be applied by the customer or purchaser of the conveying apparatus without interfering with the discharge from the conveyor trough.

The lower edge of the particular hold-down bar 50 selected for illustration is tapered upwardly at 64 and 65 in opposite directions from the lower hold-down portion 56. As a result, the hold-down bar 50 will act as set forth when the endless chain 12 is travelling in the direction indicated by the arrow 13 in FIGURE 1, and it will act similarly if the endless chain 12 is reversed and driven in the opposite direction.

The coaction of the hold-down portion 56 of the bar 50 with the chain 12 effectively accomplishes the desired results, and no ledges or the like are presented along which the material being conveyed would collect. All sharp edges of the bar 50 may be eliminated by grinding, and thus smooth and effective coaction with the chain is provided.

Continuous longitudinally through the length of the trough are a pair of flight supports, or flight support rods 70, or balancing members one between each of the opposite sides of the travel bar 40 and the proximate sides 24 of the trough. The flight supports 70 may be formed of cold finished stock, and are attached to the tops of the guide supports 36, for example, by welding or otherwise as desired, as indicated at 71.

One of the longitudinal flight supports 70 is disposed beneath each of the downwardly directed surfaces 72 at the opposite ends of the flights 20 along the upper return run of the chain 12. As thus disposed, the supports 70 prevent or limit tipping of the flights 20 in amount which would permit the endless chain 12 from getting off the guide strip 46, or which would permit the ends of the flights from getting below the spaced and transversely disposed guide supports 36, which might result in breaking or injuring the flights, or jamming or blocking the operation of the conveyor.

The embodiment of the invention disclosed in the drawings and the specification is for illustrative purposes only, and it is to be expressly understood that said drawings and the specification are not to be construed as a definition of the limits or scope of the invention reference being had to the appended claims for that purpose.

I claim:
1. In a conveyor for conveying free flowing materials, the combination of a conveyor trough having spaced upright sides and a bottom having a discharge outlet which may vary in its positioning in different installations, an endless conveyor trained about sprockets and having upper and lower runs provided with flights operable within said trough, a travel bar extending longitudinally within said trough between the spaced upright sides thereof, a hold-down bar coacting with said lower run of said conveyor to prevent undue rise of the flights along the lower run of the conveyor from the volume of material in the bottom of said conveyor trough, said hold-down bar having upstanding spaced flanges adapted to be slipped over said travel bar at different locations longitudinally along said travel bar in position where the hold-down bar will not interfere with the discharge of material through the discharge opening in the bottom of the trough, and screw means threaded into threaded openings in said spaced flanges of said hold-down bar and into engagement with said travel bar to fix said hold-down bar to said travel bar at a position where said hold-down bar will not interfere with the discharge of material through the discharge opening in the bottom of said trough.

2. A conveyor according to claim 1, wherein there is a strip of high wearing material on the upper surface of the travel bar which coacts with the upper run of the endless conveyor for supporting the upper run of the conveyor in its longitudinal movement within said trough.

3. A conveyor according to claim 1, wherein the travel bar has openings through which longitudinally spaced supports are passed, and washers passing over said supports into position with one of the washers against each of the opposite sides of said travel bar and welded to said supports.

4. A conveyor according to claim 1, wherein there is a strip of high wearing material secured to the upper surface of the travel bar and which strip coacts with the upper run of the endless conveyor for supporting the upper run of the conveyor in its longitudinal movement within said trough.

5. A conveyor according to claim 1, wherein the hold-down bar is inclined upwardly in opposite directions from the lower hold-down portion of said bar to act in each of the opposite directions of movement of a reversible conveyor.

6. A conveyor according to claim 1, wherein the travel bar has openings through which longitudinally spaced supports are passed, washers passing over said supports into position with one of the washers against each of the opposite sides of the travel bar and secured to said supports, and a strip of high wearing material secured to the upper surface of the travel bar and which strip coacts with the upper run of the endless conveyor for supporting the upper run of the conveyor in its longitudinal movement within said trough.

References Cited in the file of this patent
UNITED STATES PATENTS

| | | |
|---|---|---|
| 1,197,345 | Cleven | Sept. 5, 1916 |
| 2,747,725 | Hatch | May 29, 1956 |
| 3,047,128 | Escher | July 31, 1962 |